United States Patent
Sleboda et al.

(10) Patent No.: US 7,225,067 B2
(45) Date of Patent: May 29, 2007

(54) VEHICLE OCCUPANT SENSING SYSTEM FOR A VEHICLE SEAT ASSEMBLY AND METHOD OF OPERATING THE SAME

(75) Inventors: Pawel W. Sleboda, Bloomfield Hills, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 254 days.

(21) Appl. No.: 10/884,242

(22) Filed: Jul. 2, 2004

(65) Prior Publication Data

US 2006/0004518 A1   Jan. 5, 2006

(51) Int. Cl.
    G06F 7/02      (2006.01)
    B60K 28/04     (2006.01)
(52) U.S. Cl. ................ 701/36; 701/49; 180/273
(58) Field of Classification Search ........ 701/300, 701/36, 49; 180/273; 307/9.1, 10.1
    See application file for complete search history.

(56) References Cited

U.S. PATENT DOCUMENTS

| | | | |
|---|---|---|---|
| 5,377,108 A | 12/1994 | Nishio | 364/424.05 |
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,583,771 A | 12/1996 | Lynch et al. | 364/424.045 |
| 5,594,222 A | 1/1997 | Caldwell | 200/600 |
| 5,653,462 A | 8/1997 | Breed et al. | 280/735 |
| 5,684,701 A | 11/1997 | Breed | 364/424.055 |
| 5,694,320 A | 12/1997 | Breed | 364/424.055 |
| 5,696,409 A * | 12/1997 | Handman et al. | 307/10.1 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |

(Continued)

FOREIGN PATENT DOCUMENTS

EP    0 689 967 A1    3/1996

(Continued)

*Primary Examiner*—Y. Beaulieu
(74) *Attorney, Agent, or Firm*—Bill Panagos

(57) ABSTRACT

A vehicle occupant sensing system including at least one transmitter operable to create a transmitted magnetic field and at least one receiver operatively fixed relative to the transmitter. Additionally, the vehicle occupant sensing system includes at least one conductive object operable to create a resultant magnetic field due to interaction with the transmitted magnetic field. The receiver is operable to detect changes in relative distance between the conductive object and the receiver, in response to a load, as a function of the strength of the resultant magnetic field experienced by the receiver. Furthermore, the vehicle occupant sensing system may be employed in a vehicle seat assembly for detecting a condition of the same. A method of operating the vehicle occupant sensing system is also disclosed.

17 Claims, 3 Drawing Sheets

U.S. PATENT DOCUMENTS

| | | | |
|---|---|---|---|
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B2 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B2 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B2 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,480,103 B1 * | 11/2002 | McCarthy et al. | 340/425.5 |
| 6,506,069 B2 | 1/2003 | Babala et al. | 439/248 |
| 6,520,535 B1 | 2/2003 | Stanley et al. | 280/735 |
| 6,532,408 B1 | 3/2003 | Breed | 701/45 |
| 6,577,023 B1 | 6/2003 | Stanley et al. | 307/10.1 |
| 6,605,877 B1 | 8/2003 | Patterson et al. | 307/10.1 |
| 6,609,054 B2 | 8/2003 | Wallace | 701/45 |
| 6,609,055 B2 | 8/2003 | Stanley | 701/45 |
| 6,615,122 B1 | 9/2003 | Yamashita | 701/45 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0009273 A1 | 1/2003 | Stanley et al. | 701/45 |
| 2003/0040858 A1 | 2/2003 | Wallace | 701/45 |
| 2003/0071479 A1 | 4/2003 | Schaller et al. | 296/136 |
| 2003/0083795 A1 | 5/2003 | Stanley | 701/45 |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |

FOREIGN PATENT DOCUMENTS

| | | |
|---|---|---|
| WO | WO 98/41424 | 3/1997 |
| WO | WO 03/100462 A2 | 12/2003 |

* cited by examiner

VEHICLE OCCUPANT SENSING SYSTEM FOR A VEHICLE SEAT ASSEMBLY AND METHOD OF OPERATING THE SAME

BACKGROUND OF THE INVENTION

1. Field of the Invention

The present invention relates generally to a vehicle seat assembly, and more particularly to a vehicle occupant sensing system for a vehicle seat assembly and method of operating the same.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt extending diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed to be not cost effective. Thus, there became a recognized need in the art for a means to selectively control the deployment of the airbags such that deployment occurs only when the seat is occupied.

Partially in response to this need, vehicle safety systems have been proposed that are capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant.

While prior art occupant sensing systems tend to function for their intended purpose, many suffer from certain disadvantages. For example, many occupant sensing systems include a multitude of complex subcomponents, such as sensors, emitters, fluid bladders, controllers, and the like. The multiplicity of the components in these systems increases manufacturing time and cost. Moreover, many prior art systems need a fairly high amount of energy to power the system. Furthermore, some prior art systems are not robust enough for all vehicle conditions. For instance, the fluid bladders in some systems can rupture over time, thereby rendering the system inoperable.

Therefore, there is an ongoing need in the art for a simplified vehicle occupant sensing system that includes relatively few parts to thereby reduce cost and manufacturing time. There is also an ongoing need in the art for a more robust vehicle occupant sensing system that needs relatively little input power.

SUMMARY OF THE INVENTION

The present invention overcomes the disadvantages in the related art in a vehicle occupant sensing system adapted for operative attachment to a vehicle seat assembly. The vehicle occupant sensing system includes at least one transmitter operable to create a transmitted magnetic field. The vehicle occupant sensing system also includes at least one receiver operatively fixed relative to the transmitter. Additionally, the vehicle occupant sensing system includes at least one conductive object operable to create a resultant magnetic field due to interaction with the transmitted magnetic field. The receiver is operable to detect, in response to a load, changes in relative distance between the conductive object and the receiver as a function of the strength of the resultant magnetic field experienced by the receiver.

The present invention is also directed to a method of detecting a condition of a vehicle seat assembly with a vehicle occupant sensing system that includes at least one transmitter, receiver, and conductive object. The method involves creating a transmitted magnetic field with the transmitter, and then creating a resultant magnetic field with the conductive object due to interaction with the transmitted magnetic field. Next, the method involves detecting changes in relative distance between the conductive object and the receiver as a function of the strength of the resultant magnetic field experienced by the receiver.

One advantage of the present invention is that the vehicle occupant sensing system and the method of operating the same can be used to detect whether the seat assembly is occupied, whether the seat assembly is occupied by a human occupant, to detect the current occupant's weight, and/or to detect the current occupant's sitting position. Advantageously, the vehicle occupant sensing system includes relatively few parts, which thereby reduces costs and manufacturing time. Also, the vehicle occupant sensing system is relatively robust because it does not rely on bladders or other components that are more subject to failure. Finally, the power requirements for the present invention are relatively low since the transmitters do not receive a large amount of power and the controller consumes relatively little power in processing the signals from the receivers.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
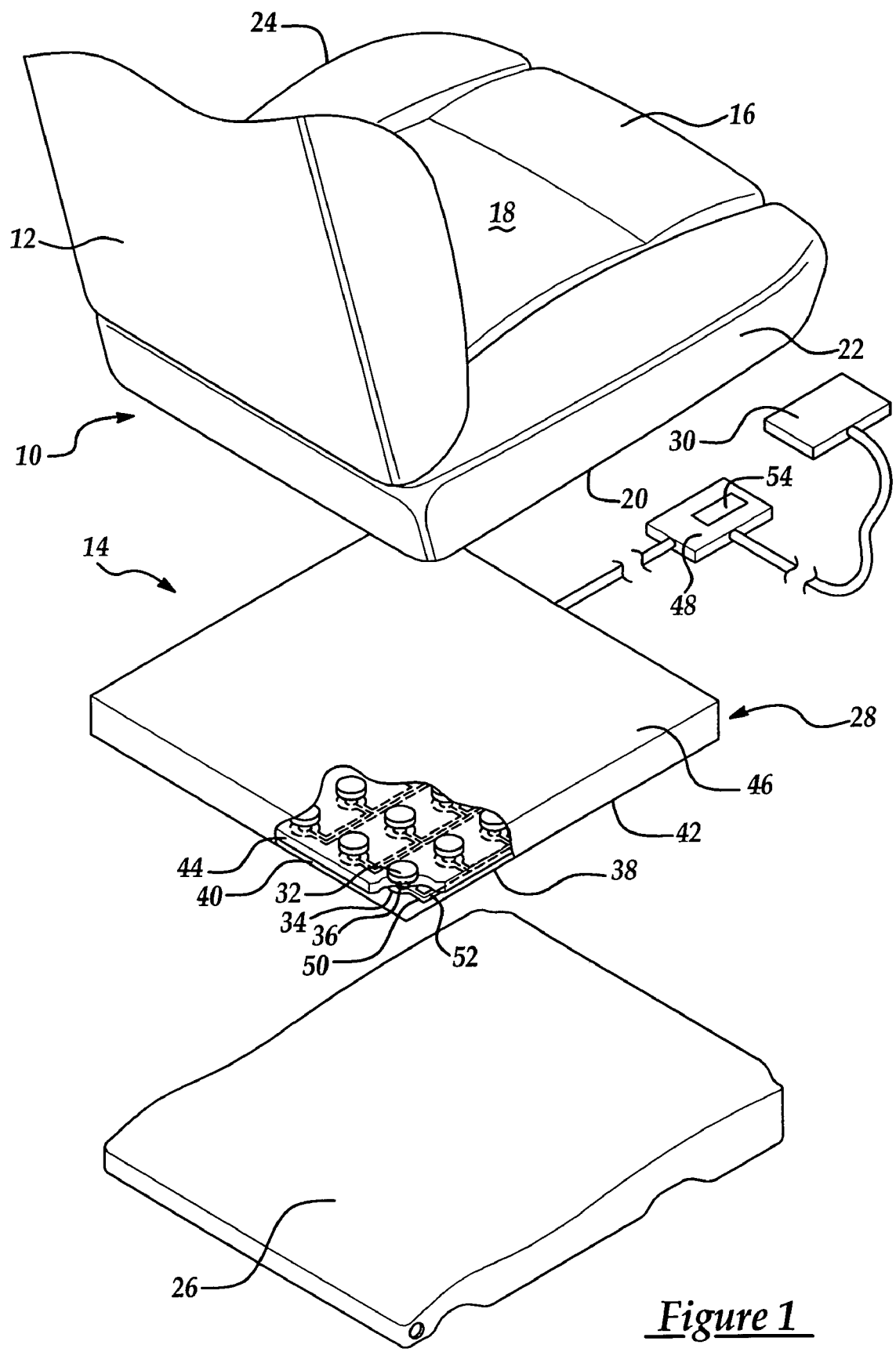
FIG. 1 is an exploded perspective view of a vehicle seat assembly with a vehicle occupant sensing system of the present invention incorporated therein.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. The seat cushion 16 includes a displaceable material such as foam. When an occupant or other object (not shown) is supported on the lower seat assembly 14, the weight of the object will deform and displace the displaceable material of the seat cushion 16 and will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan 26. The seat pan 26 is a flat, plate-like member and is generally disposed beneath the lower surface 18 so as to support the seat cushion 16. In turn, the seat pan 26 is operatively supported relative to the floor of the vehicle using any suitable structure of the type commonly known in the art, such as a seat track (not shown).

In addition, the vehicle seat assembly 10 includes a vehicle occupant sensing system, generally indicated at 28. The vehicle occupant sensing system 28 is adapted for operative attachment to the vehicle seat assembly 10 and is used for detecting a condition of the vehicle seat assembly 10, such as whether the seat assembly 10 is occupied, whether the seat assembly 10 is occupied by a human occupant, to detect the current occupant's weight, and/or to detect the current occupant's sitting position.

In the embodiment shown, a restraint system, schematically illustrated at 30, is positioned relative to the vehicle seat assembly 10. The restraint system 30 can be one of many types, such as an air bag system. As will be discussed in greater detail below, the restraint system 30 is operatively connected to the vehicle occupant sensing system 28 and operates based on the condition detected in the vehicle seat assembly 10. Although an airbag restraint system is discussed here, those having ordinary skill in the art will recognize that the restraint system employed with the vehicle occupant sensing system 28 of the present invention may be any one of a number of known types without departing from the scope of the present invention.

The vehicle occupant sensing system 28 includes at least one, and preferably, a plurality of conductive objects 32. In the embodiment shown, the conductive objects 32 are disc-shaped and are made out of an electrically conductive material. The conductive objects 32 are intermittently spaced about the lower surface 20, or B-side, of the seat cushion 16. The conductive objects 32 are adapted to move in response to a load on the seat cushion 16. More specifically, when an occupant or other object (not shown) is positioned on the upper surface 18, or A-side, of the seat cushion 16, the foam therein moves toward the seat pan 26, and the conductive objects 32 also move toward the seat pan 26 due to this displacement. As will be described below, this movement allows the vehicle occupant sensing system to detect an occupant or another condition of the vehicle seat assembly 10.

The vehicle occupant sensing system 28 also includes at least one, and preferably, a plurality of transmitters 34. Furthermore, the vehicle occupant sensing system 28 includes at least one, and preferably, a plurality of receivers 36. Each transmitter 34 is paired with a corresponding receiver 36, and the number of these pairs corresponds with the number of conductive objects 32. The transmitters 34 and the receivers 36 are operatively disposed underneath the lower surface 20 of the seat cushion 16, and each transmitter/receiver pair is positioned underneath a corresponding conductive object 32.

In the embodiment shown, the transmitters 34 and receivers 36 are each operatively fixed to a sensor mounting member 38. The sensor mounting member 38 is flat, rectangular, and positioned between the seat pan 26 and the conductive objects 32. The sensor mounting member 38 can be a printed circuit board, a flexible circuit, or any other suitable material.

In one embodiment, each receiver 36 is operatively fixed at a distance from a corresponding transmitter 34 on the sensor mounting member 38. For instance, each transmitter 34 and each receiver 36 are formed into coils with any suitable number of windings and are supported on a top surface 40 of the sensor mounting member 38. Each receiver 36 is positioned inside the coil of the transmitter 34 with a portion of the sensor mounting member 38 separating the two. In another embodiment not shown, the transmitter 34 is operatively fixed to a bottom surface 42 of the sensor mounting member 38 and the receiver 36 is operatively fixed to the top surface 40 of the sensor mounting member 38 such that the thickness of the sensor mounting member 38 separates the receiver 36 from the corresponding transmitter 34. By spatially isolating the receivers 36 from the transmitter in this way, the receivers 36 are able to detect the distance between the conductive objects 32 and the receivers 36 as will be discussed in greater detail below.

The vehicle occupant sensing system 28 further includes at least one biasing member 44. In the embodiment shown, the biasing member 44 is a sheet of compressible and resilient foam interposed between the array of conductive objects 32 and the sensor mounting member 38. In one embodiment, the conductive objects 32 are fixed to the biasing member 44. The biasing member 44 biases the conductive objects 32 away from the corresponding receivers 36 and transmitters 34. As such, when the weight of an occupant or other object moves the conductive objects 32 toward the receivers 36 and transmitters 34, the biasing member 44 provides a predetermined amount of resistance to such movement and also returns the conductive objects 32 to a predetermined position when the weight is removed. Those having ordinary skill in the art will recognize that the biasing member 44 can alternatively be a variety of types, such as a coiled or leaf spring, without departing from the spirit of the invention.

The vehicle occupant sensing system 28 also includes an encapsulating member 46. In the preferred embodiment, the encapsulating member 46 is a flat, box-like member made out of a flexible material, such as a polymer. The encapsulating member 46 is also hollow so as to contain the conductive objects 32, the biasing member 44, the sensor mounting member 38, the receivers 36, and the transmitters 34. Alternatively, the vehicle occupant sensing system 28 may include a plurality of encapsulating members 46, each encapsulating an individual grouping of a conductive object 32, a transmitter 34, and a receiver 36. With the addition of the encapsulating member 46, the vehicle occupant sensing system 28 is self-contained, thereby allowing the vehicle occupant sensing system 28 to be installed into the seat assembly 10 more easily. The encapsulating member 46 also inhibits foreign objects from entering the entering the vehicle occupant sensing system 28.

As will be described in greater detail below, each transmitter 34 is operable to create a transmitted magnetic field. More specifically, the transmitter 34 is an oscillator, such that current sent to the transmitter 34 oscillates therein. For instance, in one embodiment, the current may oscillate at 5 mHz. As the current oscillates, the transmitter 34 creates the transmitted magnetic field with oscillating polarity. Each conductive object 32 is operable to create a resultant magnetic field due to interaction with this transmitted magnetic field. Specifically, the transmitted magnetic field induces a flow of current in the corresponding conductive object 32. This flow of current in turn creates the resultant magnetic field with an oscillating polarity opposite to that of the transmitted magnetic field. As stated above, the receiver 36 and the transmitter 34 are isolated from each other on the sensor mounting member 38, and as such, the transmitted magnetic field 34 created by the transmitter 34 does not affect the receiver 36. However, the resultant magnetic field created by the conductive object 32 induces a small electric current to travel through the coil of the receiver 36. This current oscillates at the same frequency as that of the resultant magnetic field. The closer the conductive object 32 is to the corresponding transmitter 34, the stronger the resultant magnetic field and the stronger the electric current generated within the receiver 36. As such, the receiver 36 is operable to detect changes in relative distance between the corresponding conductive object 32 and the receiver 36 as a function of the strength of the resultant magnetic field experienced by the receiver.

The vehicle occupant sensing system 28 also includes a controller, schematically illustrated at 48. The controller 48 can be a separate, dedicated computerized system, part of the general computer system of the vehicle (not shown), or any other suitable system. A plurality of first leads 50 electrically connects the plurality of transmitters 34 and the controller 48, and a plurality of second leads 52 electrically connects the plurality of receivers 36 and the controller 48. As such, the controller 48 is in electrical communication with the transmitters 34 and the receivers 36. The controller 48 sends signals to the transmitters 34 via the first leads 50, and these signals cause the receivers to generate the transmitted magnetic field. The controller 48 also receives signals from the receivers 36 via the second leads 52 indicative of the relative distance between the receivers 36 and the corresponding conductive objects 32. The controller 48 can include an amplifier to amplify this signal and an analog-to-digital converter to convert the signal to a digital signal. The controller 48 can also include phase demodulators and other filters that allow the receivers 36 to distinguish between the conductive objects 32 and other foreign objects that may be nearby.

In the embodiment shown, the controller 48 also includes a database 54 containing sitting reference data. The sitting reference data of the database 54 is data amassed through testing of the vehicle seat assembly 10. During the testing, an occupant is positioned on the vehicle seat assembly 10, and the signals transmitted from the receivers 36 to the controller 48 are recorded as data in the database 54. This information is correlated to the measured weight and/or sitting position of the test occupant. These tests are repeated multiple times with other occupants and/or with different sitting positions so that the database 54 contains data representative of a wide range of occupant weights (i.e., weight data) and/or occupant sitting positions (i.e., sitting position data). These tests could also be performed with inanimate objects that are representative of human occupants. As will be described in greater detail below, the database 54 is referenced during normal operation of the vehicle occupant sensing system 28 to thereby detect whether the seat assembly 10 is occupied, whether the seat assembly 10 is occupied by a human occupant, to detect the current occupant's weight, and/or to detect the current occupant's sitting position. The controller 48 in turn sends signals to the restraint system 30 based on this comparison. For instance, if the restraint system 30 is an airbag system, and the controller 48 detects the occupant is sitting toward the front of the seat cushion 16, the controller sends a signal to the restraint system 30 to disable the restraint system 30 or to deploy the restraint system 30 more gradually in the event of an accident, thereby restraining the occupant safely. In another example, if the controller 48 detects the occupant is below a certain weight, the controller sends a signal to the restraint system 30 to disable the airbag or to deploy more gradually in the event of an accident, thereby restraining the occupant safely. In still another example, if the controller 48 detects that the seat cushion 16 is unoccupied or that an inanimate object is positioned on the seat cushion 16, the controller 48 sends a signal to the restraint system 30 to disable the airbag to thereby avoid the cost of reinstalling the airbag.

Figure 2:
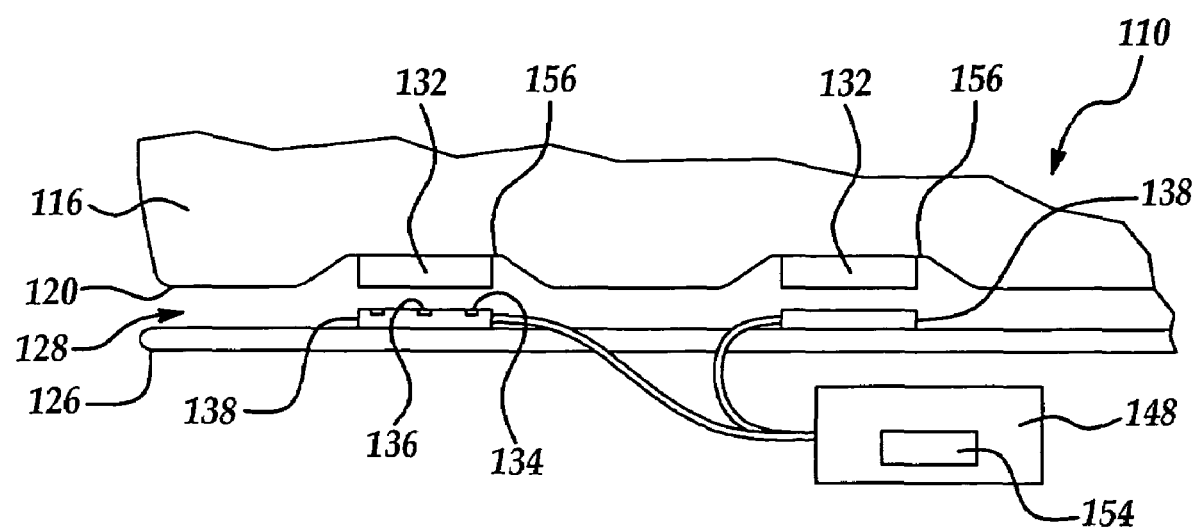
FIG. 2 is a cross sectional view of a vehicle seat assembly with another embodiment of a vehicle occupant sensing system of the present invention incorporated therein.

Turning now to FIG. 2, a second embodiment of a vehicle seat assembly is generally indicated at 110, where like numerals increased by 100 are used to designate like structure with respect to the embodiment illustrated in FIG. 1. In this embodiment, the lower surface 120 of the seat cushion 116 includes a plurality of depressions 156 molded therein. The vehicle seat assembly 110 also includes a vehicle occupant sensing system 128, an alternative embodiment of the vehicle occupant sensing system 28 of FIG. 1. A conductive object 132 is operatively fixed to the lower surface 120, within each depression 156, of the seat cushion 116. The conductive objects 132 can be adhered, fastened, molded, or otherwise suitably fixed to the seat cushion 116 within the depressions 156. Also, in the embodiment of FIG. 2, there are a plurality of sensor mounting members 138, each supporting an individual transmitter and receiver. Each sensor mounting member 138 is supported by the seat pan 126 and is positioned underneath a corresponding conductive object 132. The embodiment shown in FIG. 2 can be manufactured differently than the embodiment of FIG. 1 in that the conductive objects 132 can be installed into the vehicle seat assembly 110 separate from the sensor mounting member 138. Those having ordinary skill in the art will recognize other alternative embodiments that are also within the scope of the present invention. For instance, in one embodiment not shown, the conductive objects 132 may be operatively fixed to the seat pan 126 and the sensor mounting member 138 may be positioned relative to the seat cushion 116 such that loading of the seat cushion 116 moves the transmitter 134 and receiver 136 relative to the stationary conductive object 132.

Figure 3:
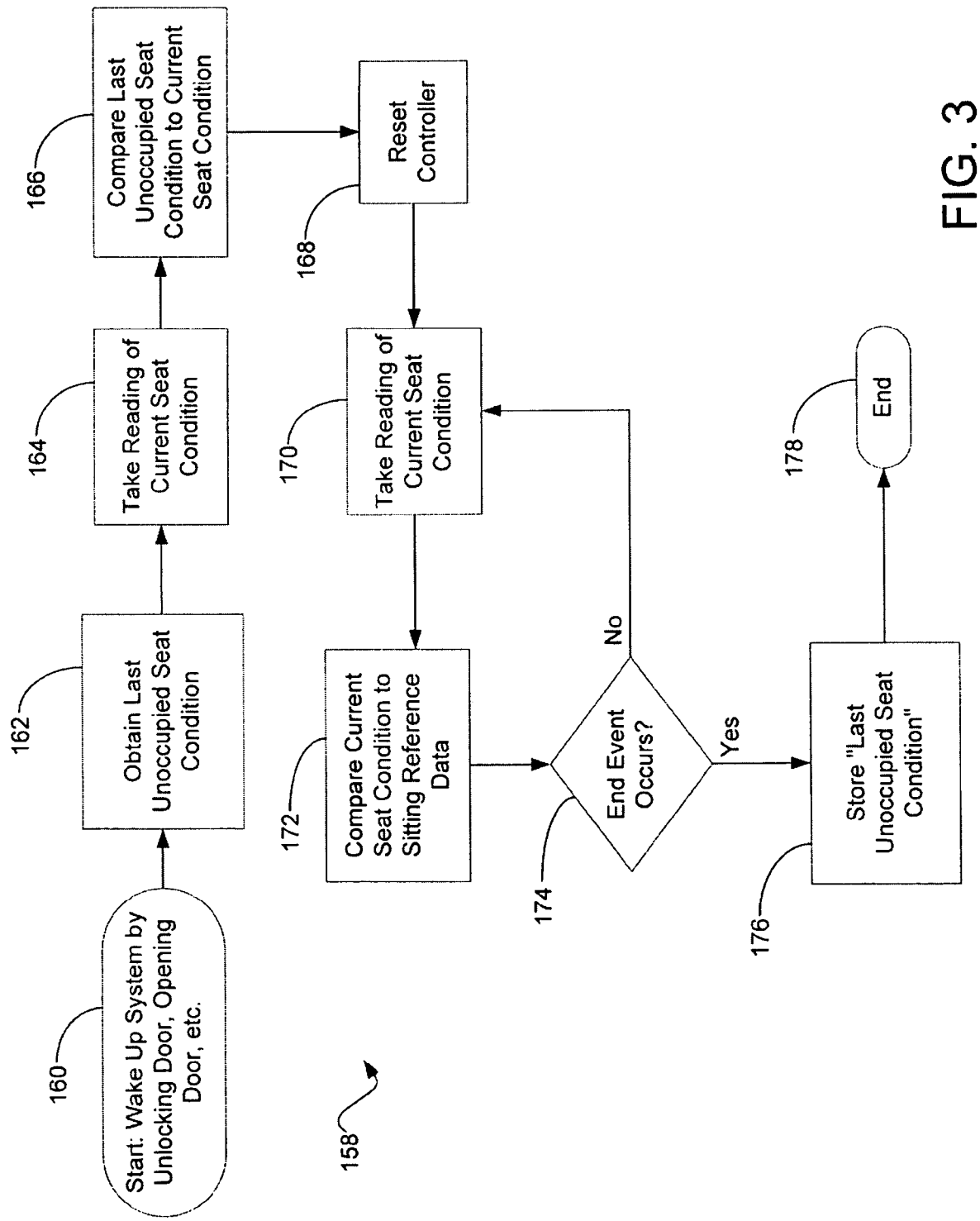
FIG. 3 is a flow chart illustrating a method of detecting a condition of a vehicle seat assembly.

Turning now to FIG. 3, a method of operation for the vehicle occupant sensing system 28, 128 is schematically illustrated and generally indicated at 158. As shown, the method 158 begins at 160, which involves "waking up" the vehicle occupant sensing system 28, 128. The vehicle occupant sensing system 28, 128 can be programmed to "wake up" with an event during which the seat cushion 16, 116 is unlikely to be occupied, such as the opening of a vehicle door, the unlocking a vehicle door, or other suitable event. Next, in step 162, the controller 48, 148 obtains a "last unoccupied seat condition." As will be described in greater detail below, the controller 48, 148 stores the signal array coming from the receivers 36, 136 just before the vehicle occupant sensing system 28, 128 is turned off, and this is termed the "last unoccupied seat condition." Thus, in step 162, the controller 48, 148 retrieves this "last unoccupied seat condition" saved in memory. Subsequently, in step 164, the controller 48, 148 takes a reading of the "current seat condition." More specifically, the receivers 36, 136 detect the distance to the corresponding conductive object 32, 132, and each receiver 36, 136 sends a correlative signal to the controller 48, 148. Step 166 involves comparing the "last unoccupied seat condition" retrieved in step 162 to the "current seat condition" read in step 164. The comparison allows the vehicle occupant sensing system 28, 128 to determine if the "current seat condition" readings are equal to, greater than, or less than the "last unoccupied seat condition." In step 170, the method 158 includes resetting the controller 48, 148. Steps 166 and 168 allow the vehicle occupant sensing system 28, 128 to account for any changes in seat loading while the vehicle occupant sensing system 28, 128 was not operational. For instance, temperature changes may affect the system 28, 128 slightly, and steps 166 and 168 will account for the changes. Specifically, if the temperature difference changes the distance between the conductive objects 32, 132 and the corresponding receivers 36, 136, the difference will be detected in steps 166 and 168. Once the controller 48, 148 is zeroed in step 168, the difference will not factor in when determining the weight of the occupant. As such, the readings become more accurate.

Once the controller 48, 148 is zeroed, step 170 involves taking a reading of the current seat condition. As described above, step 170 includes creating the transmitted magnetic field with each transmitter 34, 134, and then creating the resultant magnetic field with the corresponding conductive objects 32, 132 due to interaction with the transmitted magnetic field. Step 170 also includes detecting changes in relative distance between the conductive objects 32, 132 and the corresponding receivers 36, 136 as a function of the strength of the resultant magnetic field experienced by the receivers 36, 136. The sitting reference data in the database 54, 154 is compared to the data communicated from the receivers 36, 136 in step 172. This comparison could occur in any suitable manner. For instance, the relative distance between a single conductive object 32, 132 and its corresponding receiver 36, 136 may be detected by the receiver 32, 132 and a correlative signal may then be sent to the controller 48, 148. This relative distance is compared to the reference data for that particular grouping of receiver 36, 136 and its conductive object 32, 132. As such, the vehicle occupant sensing system 28, 128 can detect one or more conditions of the vehicle seat assembly 10, 110 such as whether the seat assembly 10 is occupied, whether the seat assembly 10 is occupied by a human occupant, to detect the current occupant's weight, and/or to detect the current occupant's sitting position.

The method 158 continues in decision block 174 in which it is determined whether or not an end event occurs. Turning off the engine of the vehicle or other suitable event can serve as an end event. If an end event does not occur, the vehicle occupant sensing system 28, 128 continues taking readings of the current seat condition and then comparing those readings to the sitting reference data. Once an end event does occur, however, the method 158 moves to step 176 which involves storing the "last unoccupied seat condition." Specifically, the controller 48, 148 waits until the seat cushion 16 is unoccupied and then takes a reading of the distances between the conductive objects 32, 132 and the corresponding receivers 36, 136. As noted above, step 176 preferably occurs once the seat cushion 16, 116 is unoccupied. For instance, the controller 48, 148 can wait until the vehicle door is closed or wait until the vehicle door is locked to initiate step 176. Then, the method 158 ends in step 178.

Thus, the vehicle occupant sensing system 28, 128 and the method of operating the same can be used to detect whether the vehicle seat assembly 10, 110 is occupied or vacant, the weight of the occupant, the sitting position of the occupant, and/or other suitable seat conditions. Advantageously, the vehicle occupant sensing system 28, 128 includes relatively few parts, which thereby reduces costs and manufacturing time. Also, the vehicle occupant sensing system 10, 110 is relatively robust because it does not rely on bladders or other components that are more subject to failure. Finally, the power requirements are relatively low since the transmitters 34, 134 do not receive a large amount of power, and the controller 48, 148 consumes relatively little power in processing the signals from the receivers 36, 136.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A vehicle occupant sensing system comprising:

at least one transmitter operable to create a transmitted magnetic field;

at least one receiver operatively fixed relative to said transmitter; and at least one conductive object operable to create a resultant magnetic field due to interaction with the transmitted magnetic field, an encapsulating member acting to contain said transmitter, receiver, and conductive object and preventing foreign objects from entering said vehicle occupant sensing system, said receiver operable to detect changes in relative distance between said conductive object and said receiver in response to a load as a function of the strength of the resultant magnetic field experienced by said receiver to thereby sense the presence of an occupant of a vehicle seat.

2. The vehicle occupant sensing system as set forth in claim 1, further comprising a sensor mounting member, said transmitter and said receiver each operatively fixed to the sensor mounting member.

3. The vehicle occupant sensing system as set forth in claim 1, wherein said receiver and said transmitter are operatively fixed at a distance from each other so as to be spatially isolated from each other.

4. The vehicle occupant sensing system as set forth in claim 1, further including at least one biasing member biasing said conductive object away from said receiver.

5. The vehicle occupant sensing system as set forth in claim 1, further including a controller in electrical communication with said receiver, said controller containing sitting reference data chosen from a group consisting of sitting position data and weight data.

6. A vehicle seat assembly comprising:
a seat cushion that includes a displaceable material and that defines a lower surface;
a vehicle occupant sensing system including at least one transmitter operable to create a transmitted magnetic field;
at least one receiver operatively fixed relative to said transmitter; and
at least one conductive object operable to create a resultant magnetic field due to interaction with the transmitted magnetic field, an encapsulating member containing said transmitter, receiver, and conductive object disposed beneath said seat cushion and acting to prevent foreign objects from entering said occupant sensing system, said receiver operable to detect changes in relative distance between said conductive object and said receiver in response to displacement of said displaceable material as a function of the strength of the resultant magnetic field experienced by said receiver, thereby detecting a condition of the seat cushion to thereby sense the presence of an occupant of said vehicle seat.

7. A vehicle seat assembly as set forth in claim 6, wherein said conductive object is operatively fixed to said lower surface of said seat cushion.

8. A vehicle seat assembly as set forth in claim 6, wherein said transmitter and said receiver are operatively disposed underneath the lower surface of said seat cushion.

9. A vehicle seat assembly as set forth in claim 6, further including a controller in electrical communication with said receiver, said controller containing sitting reference data chosen from a group consisting of sitting position data and weight data.

10. A vehicle seat assembly as set forth in claim 6, further comprising a sensor mounting member, said transmitter and said receiver each operatively fixed to the sensor mounting member.

11. A vehicle seat assembly as set forth in claim 6, wherein said receiver and said transmitter are operatively fixed at a distance from each other so as to be spatially isolated from each other.

12. The vehicle seat assembly as set forth in claim 6, further including at least one biasing member biasing said conductive object away from said receiver.

13. A method of detecting a condition of a vehicle seat assembly with a vehicle occupant sensing system including at least one transmitter, at least one receiver, and at least one conductive object, said method comprising the steps of:
comparing a last unoccupied seat condition to a current seat condition;
generating a transmitted magnetic field;
generating a resultant magnetic field due to interaction of the conductive object with said transmitted magnetic field;
detecting changes in relative distance between the conductive object and the receiver as a function of the strength of the resultant magnetic field experienced by the receiver to thereby sense the presence of an occupant of said vehicle seat.

14. A method of detecting a condition of a vehicle seat assembly as set forth in claim 13, further including the step of:
comparing sitting reference data to relative distance detected between the conductive object and the receiver.

15. A method of detecting a condition of a vehicle seat assembly as set forth in claim 13, further including the step of:
resetting a controller that is in operative communication with the receiver and the transmitter before generating a transmitted magnetic field.

16. A method of detecting a condition of a vehicle seat assembly as set forth in claim 13, further including the step of:
waking up the vehicle occupant sensing system with an event chosen from a group consisting of opening a door and unlocking a door before generating a transmitted magnetic field.

17. A method of detecting a condition of a vehicle seat assembly as set forth in claim 16, further including the step of:
storing a last unoccupied seat condition.

* * * * *